United States Patent [19]

Trickett

[11] Patent Number: 4,842,323
[45] Date of Patent: Jun. 27, 1989

[54] TARP HANDLER

[76] Inventor: Robert Trickett, 209 -3100 - 272 Street Box 340, Aldergrivem B.C., Canada, V0X 1A0

[21] Appl. No.: 134,727

[22] Filed: Dec. 28, 1987

[30] Foreign Application Priority Data

Dec. 30, 1986 [CA] Canada .................................. 526499

[51] Int. Cl.⁴ ............................................. B60J 11/00
[52] U.S. Cl. ..................................... 296/98; 105/377
[58] Field of Search ................... 296/98, 100; 105/377; 242/86.52; 160/242, 245, 246

[56] References Cited

U.S. PATENT DOCUMENTS

| | | | |
|---|---|---|---|
| 1,898,260 | 2/1933 | Ostroff | 296/98 |
| 3,478,980 | 11/1969 | Raasch | 242/86.52 |
| 3,868,142 | 2/1975 | Bachand et al. | 296/98 |
| 4,341,416 | 7/1982 | Richard | 296/98 |

Primary Examiner—Robert R. Song
Attorney, Agent, or Firm—Nilsson, Robbins, Dalgarn, Berliner, Carson & Wurst

[57] ABSTRACT

This invention pertains to an apparatus for handling tarpaulins for load hauling vehicles. More particularly, this invention pertains to an apparatus which can roll up the tarpaulin used for load hauling tractor-trailer systems, the handler being of adjustable height and position relative to the load on the trailer. The handler is powered so as to assist in spreading the tarpaulin over the top of the load, and when the tarpaulin is not in use, winding the tarpaulin on the spool of the handler. An apparatus for storing and handling a tarpaulin for a vehicle hauling freight on its deck comprising: (a) a spool means for rolling up a tarpaulin; (b) means for supporting the spool means and enabling the position of the spool to be varied according to the position of the freight on the vehicle. The invention also pertains to an apparatus for storing and handling a tarpaulin for a freight hauling vehicle comprising: (a) a spool means for rolling up a tarpaulin; (b) extendible means for enabling the height of the spool means to be varied according to the height of the freight being hauled on the deck of the vehicle.

18 Claims, 7 Drawing Sheets

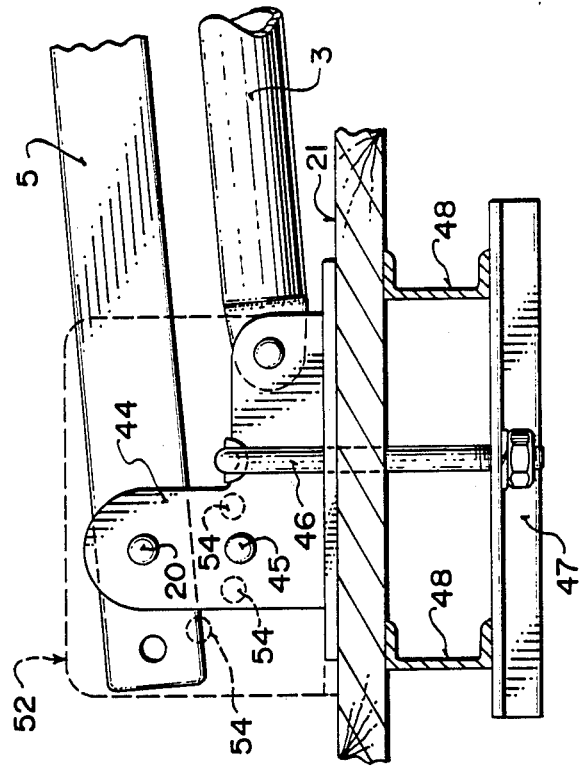
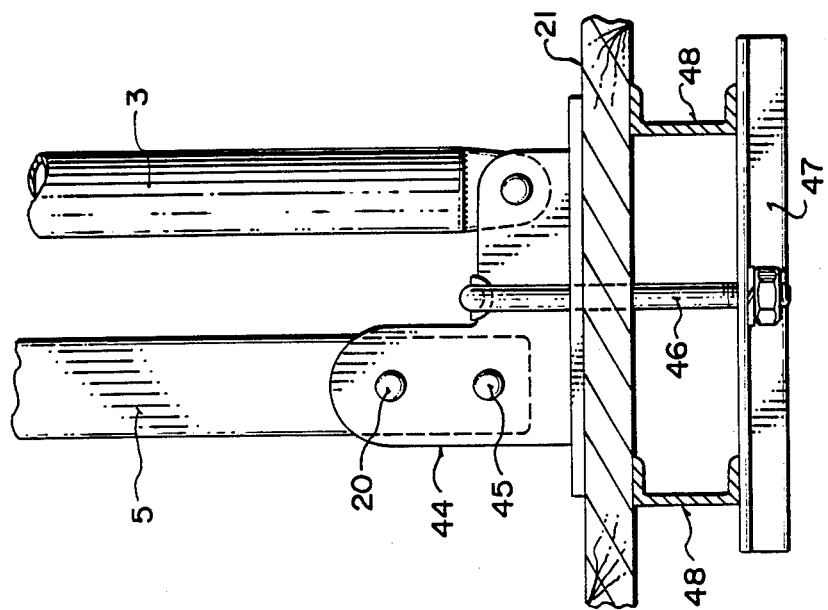
FIG. 13
FIG. 14

TARP HANDLER

FIELD OF THE INVENTION

This invention pertains to an apparatus for handling tarpaulins for load hauling vehicles. More particularly, this invention pertains to an apparatus which can roll up the tarpaulin used for load hauling tractor-trailer systems, the handler being of adjustable height and position relative to the load on the trailer. The handler is powered so as to assist in spreading the tarpaulin over the top of the load, and when the tarpaulin is not in use, winding the tarpaulin on the spool of the handler.

BACKGROUND OF THE INVENTION

There are presently various systems for handling tarpaulins ("tarps") on load hauling vehicles such as dump trucks carrying, for example, hot asphalt, or for high sided truck or trailer bodies built specifically for cargos of such different types as sulphur, salt, grain or woodchips. Such systems usually utilize the front wall of the body for a tarp roller support while the side walls and end wall are used for support and tiedown of the sides of the tarps.

In all these cases the location of the tarp storage roller is fixed. This is usually suitable because the load is typically granular bulk material which is contained with the body walls. Also the tarps are comparatively small, since they need only cover the top of the truck body. Side protection is supplied by the walls of the body.

Flatdeck trailers are employed regularly to transport various types of freight. Such freight must usually be protected from adverse elements, such as rain or snow, to prevent damage. Since the dimensions of the freight load could be up to 8 feet high, 8 feet wide and 45 feet long, the tarp must be a minimum of 25 feet wide and 64 feet long to provide proper protection. Because of their large size, the tarp weight of a single-piece tarp would be so great that once folded the tarp would be too heavy to be handled by one man. Thus the tarp must be in two or more sections to reduce the weight of each section to a manageable size. In this way a single person can lift the tarp sections onto the top of the load in preparation for covering the load. A serious problem with tarps in several sections is that they are susceptible to water ingressing through the overlapped sections and causing damage to the freight. For example, even though two or more tarps may be overlapped so that the forward tarp overlaps the rearward tarp (which prevents water being blown under the overlap as the tractor-trailer is moving down the highway) water may nevertheless run under the overlap and onto the freight when the tractor-trailer is parked on a down-hill grade.

Storage of a tarp can also present problems. Normally the tarp would be stored folded on the trailer deck or on an under-the-deck tarp carrier, which requires further strenuous manual handling of the tarp.

The applicant is aware of the following references which are deemed to be relevant to this invention:

| U.S. Pat. No. | Inventor | Issue Date |
| --- | --- | --- |
| 2,811,321 | La Barre | October, 1957 |
| 2,898,147 | Horner | August, 1959 |
| 3,478,980 | Raasch | November, 1969 |
| 3,498,666 | Harrawood | March, 1970 |
| 3,549,199 | Sibley | December, 1970 |
| 4,023,857 | Killion | May, 1977 |
| 4,095,840 | Woodard | June, 1978 |
| 4,342,480 | Roos, Jr. | August, 1982 |

Raasch discloses a roller for a truck cover, which can be used for loads mounted on flat truck beds or trailer beds. The roller resembles a large spool, with an enlarged circular hand grip. The tarp is wound up on the roller, and when used to cover a truck load or trailer load, is unwound such that the roller, after the tarp has been fully unrolled, rests at the rear of the truck, as shown in FIG. 2. Raasch does not disclose any capacity of the roller to rest on arms at the front of the bed, which arms can swing forwardly or laterally. Also, there is no disclosure of arms which can be extended.

La Barre teaches a truck tarpaulin reel assembly which can be mounted on the forward portion of an open top truck body. The reel assembly includes a pair of support brackets mounted on the sides of the truck body and support arms which are pivotally carried by the brackets. The reel can be position either in a storage position, or in a tarpaulin tensioning position which is forward and below the forward upper edge of the truck body. There is no teaching in La Barre of moving the reel forward or rearwardly in order to accommodate different load positions on the truck body.

Horner discloses a truck bed cover which consists of a reel and reel mounting means for detachably mounting the reel on a truck body. The reel has a telescoping capability which enables it to be adapted to be used on trucks of various length. There is also a capability to adjust the cover and guides to suit trucks of various widths. There is no disclosure of swingable or extendable arms, or any capacity to move the cover means forward or rearward on the truck.

Harrawood discloses a roll up load cover apparatus for dump truck bodies. A swingable arm is disclosed.

Sibley discloses a cover and reel arrangement for dump trucks, the assembly pivoting about a mid point of the truck body.

Killion discloses a tarpaulin-reel assembly for use in covering the open top of a truck body. Instead of a long swing arm, Killion utilizes an arm which can be moved along a track mounted on the side of the truck body.

Woodard also discloses a retractable cover for use on an open top truck body. A swingable arm pivots about a mid point of the truck body. The swingable arm, as illustrated in FIGS. 1 and 2, can swing from a forward position (FIG. 2) to a rearward position where the tarpaulin is extended over the top of the truck body. Woodard does not disclose any capacity to move the swing arm forwardly or rearwardly on the truck body.

Lastly, Ross, Jr. discloses a mechanized enclosure system for flat bed trailers. Rather than roll up the tarpaulin or cover, Ross, Jr. shows a collapsible bellows type arrangement whereby in a compacted form, the tarp or cover can be grouped at the front end of the flat bed trailer, while in a fully extended position, the tarp or cover extends along both sides and over the top of the flat bed trailer.

Finally, the inventor is also aware of U.S. Pat. No. 3,768,540, McSwain, which speaks about a telescoping arm for a tarpaulin spool.

SUMMARY OF THE INVENTION

The object of this invention is to provide convenient means for handling a single tarpauling (tarp) used for covering freight on flat bed trucks and trailers employing less effort, faster application, freight protection due to absence of water ingression which would occur if two or more tarpaulins were used, and providing a place to store the tarp when not in use. The tarp can be handled by one man, both when covering the load or when uncovering the load and spooling the tarp onto the storage drum. The distance of the tarp roller relative to the position of the freight on the truck or trailer can be adjusted to minimize the distance between the roller and the freight. The tarp roller height can be adjusted to match the load height. The roller can be swung forwardly out of the way in order to avoid incurring damage to the tarp, the roller and the driving mechanism of the roller when the trailer is being loaded, for example, with a forklift truck. The load on the truck or trailer may be placed adjacent to the spool support stand because the tarp spool which carries the tarp, can be swung to a forward position and so does not interfere with loading.

The roller stand can be swung down onto the trailer deck for those trips when no payload is being carried by the truck. The roller can be luffed aftwards to place it proximate to the load when the load is placed to the rear of the truck or trailer.

When spooling the tarp onto the roller the operator can stand on the trailer deck and guide the longitudinally folded tarp onto the roller while controlling the rotation speed of the driving motor with a remote control switch.

The invention pertains to an apparatus for storing and handling a tarpaulin for a vehicle hauling breight on its deck which may comprise: (a) a spool means for rolling up a tarpaulin; (b) means for supporting the spool means and enabling the position of the spool to be varied according to the position of the freight on the vehicle.

In the apparatus, the spool support means may be secured to one end of the deck of the freight hauling vehicle. An apparatus wherein the angle of the spool support means with the deck surface may be adjusted. Also, the position of the spool support means on the deck may be adjustable. Alternatively, the spool support means may be fixed at an angle to the deck.

In the apparatus, the spool means may be lowered to the deck. Also, the height of the spool support means may be varied according to the height of the freight being hauled on the vehicle.

In the apparatus, the height of the spool support means may be adjusted hydraulically. The height of the spool support means may also be adjusted manually or pneumatically.

In the apparatus, the spool support means may be a pair of telescoping arms one positioned at each end of the spool support means, one end of each arm being rotatably connected to the respective end of the spool support means, the opposite end of the arm being pivotally connected to the deck. A motor means may rotate the spool means. The motor means may be manually operable. The angle of the spool support means relative to the deck surface may be positioned so that the spool rests on the deck surface. Flanges may be mounted at each end of the spool to hold the ends of the rolled tarpaulin on the spool. A tarpaulin yoke may be affixed between the two flanges and serves to assist in holding the rolled tarpaulin on the spool. The yoke may be positioned on the underside of the spool.

The invention pertains to an apparatus for storing and handling a tarpaulin for a vehicle hauling freight on its deck which may comprise: (a) a spool means for rolling up a tarpaulin; (b) extendible means for enabling the height of the spool means to be varied according to the height of the freight being hauled on the deck of the vehicle.

DRAWINGS

In the drawings, which illustrate specific embodiments of the invention and which are for illustrative purposes only and not to be regarded as restricting the scope of the invention in any way:

FIG. 13 illustrates an isometric view of the installation of the tarp storage roller stand on a trailer and the relative location of the hydraulic power pack and controls.

FIG. 14 illustrates a detailed side elevation view of the mount for the tarp storage roller Stand and the luffing cylinder; and, FIG. 15 illustrates a detailed side elevation view of the mount with the Storage Roller Stand in collapsed orientation.

DETAILED DESCRIPTION OF SPECIFIC EMBODIMENTS OF THE INVENTION

Figure 1:
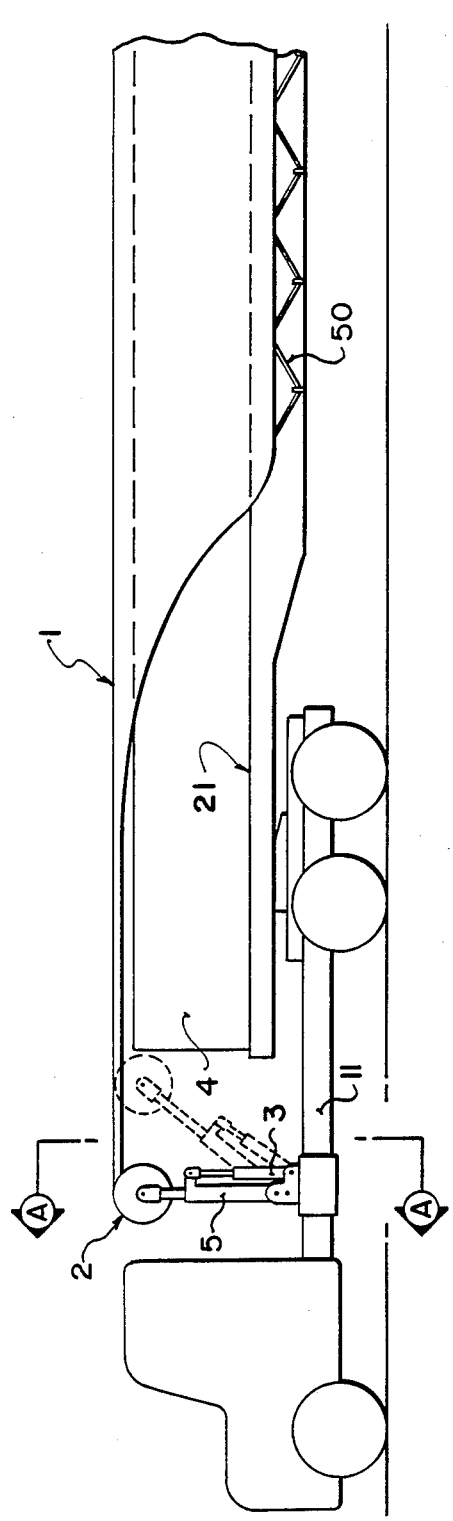
FIG. 1 illustrates a side elevation view of the tarp storage roller mounted on a tractor chassis.

Referring to the drawings, FIG. 1 illustrates a side elevation view of the tarp handler. this is intended for tractors which will tow a variety of trailers, which are not equipped with a tarp storage roller. The tarp 1 is spread on the load 4. The tarp storage roller 2 is supported by luffing cylinder 3. A telescopic stand 5 for the tarp storage roller 2 enables roller 2 to be raised or lowered. A cord 50 is used to hold the edges of the tarp 1 to the trailer frame.

Figure 2:
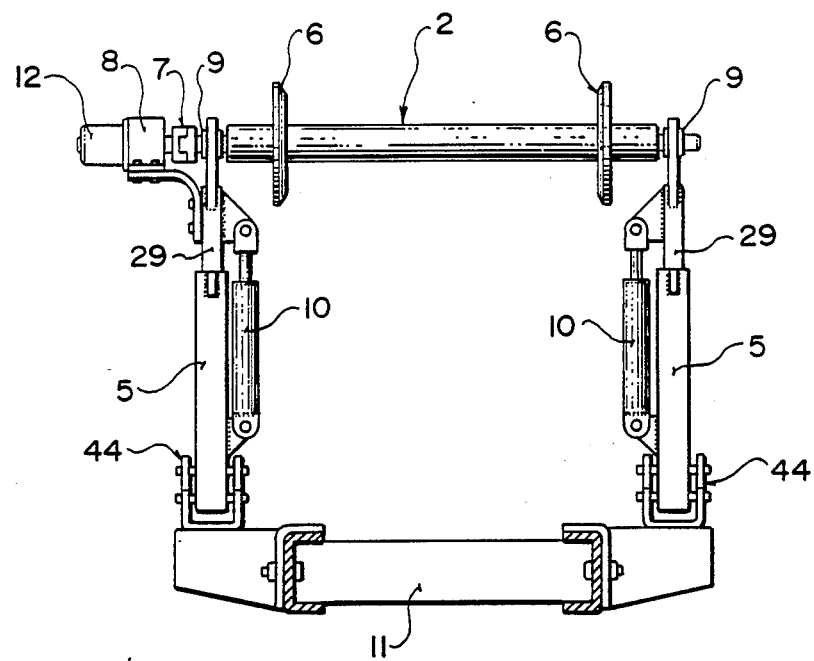
FIG. 2 represents a sectional view A—A taken along section line A—A of FIG. 1 showing the method of attaching the roller stand to the tractor chassis.

FIG. 2, which illustrates a section view taken along section line A—A of FIG. 1, shows flange 6 which contains the width of the tarp 1 when spooled onto storage roller 2. Drive coupling 7 connects the speed gear reduction unit 8 to the tarp storage roller 2. Flange type anti-friction bearings 9 (self-aligning) carry the tarp storage roller 2. Extension cylinder 10 raises and lowers the tarp storage roller 2. Tractor chassis frame members 11 are part of the trailer bed. Motor 12 drives the rotation of the roller 2 through gear reduction unit 8.

Figure 3:
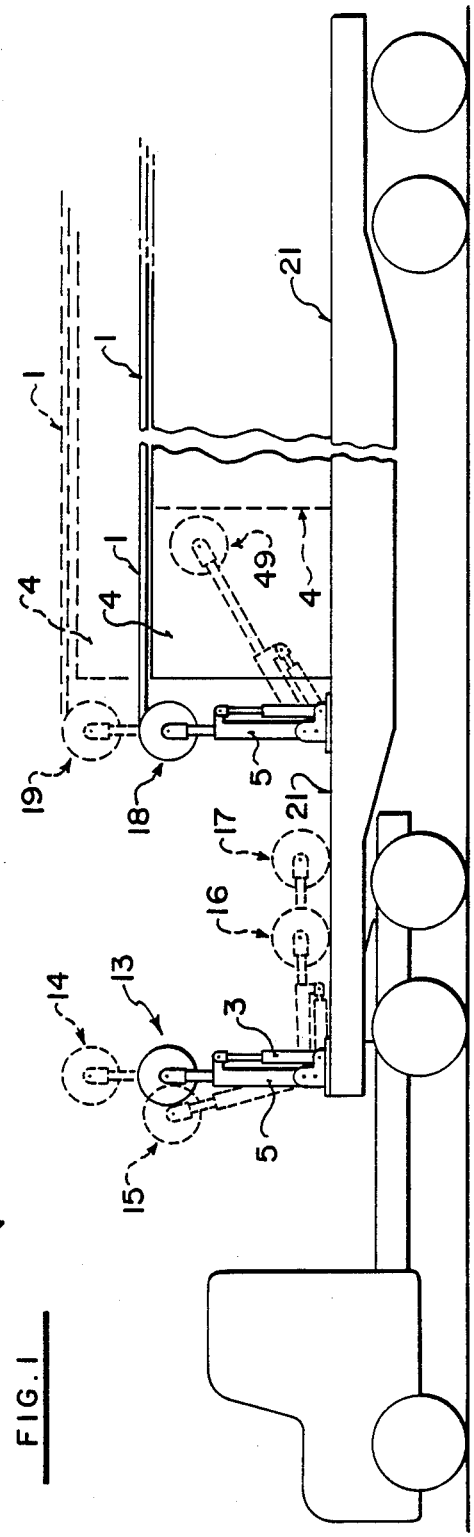
FIG. 3 illustrates a side elevation view of the tarp storage roller stand mounted on a semi-trailer.

Referring to FIG. 3, the tarp handler is illustrated mounted on the trailer 21 in various alternative positions. Reference numeral 13 illustrates the tarp storage roller 2 in normal "low" position. Number 14 illustrates the tarp storage roller 2 in "extended" position. Numeral 15 illustrates the tarp storage roller 2 tilted forward to permit easy loading of the trailer 21 up to the roller stand 5. Number 16 shows the tarp storage roller 2 while in "low" position luffed on the trailer deck 21. Reference number 17 shows the tarp storage roller 2 while in "high" position luffed on the trailer deck 21. Numbers 18 and 19 show the tarp storage roller 2 moved aftwards on the trailer deck 21 to accommodate loads which are placed farther back on the trailer. Specifically, number 18 shows the roller stand 5 in "low" position, moved aftwards on the trailer deck 21 to make it easier to handle the tarp 1 on short loads, which cannot be located at the front end of the trailer 21. Number 19 shows the stand 5 extended to "high" position while being located aftwards from the front end of the trailer 21. Reference number 49 indicates a situation when trailer 21 may be carrying a partial load or high density goods which will occupy the trailer deck 21 only partially. Instead of moving the tarp storage roller assembly 5 aftwards, it is possible using the operational features of this invention to luff the support stand towards the load and adjust the length of the telescoping legs to match as closely as possible the load height.

Figure 4:
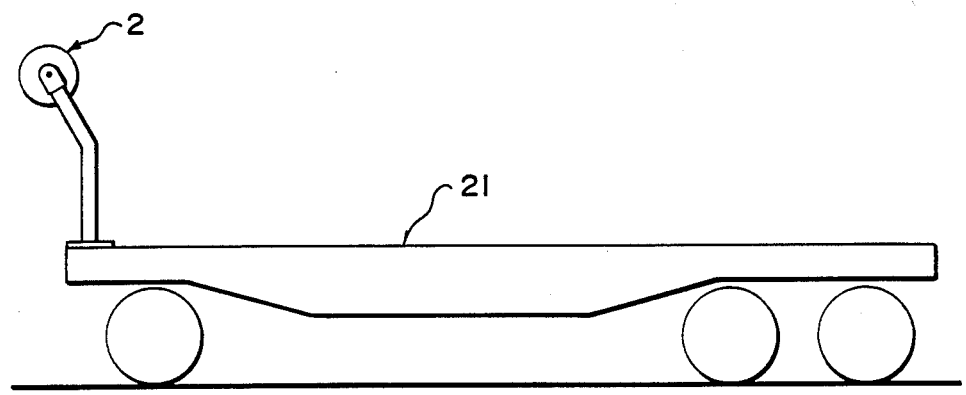
FIG. 4 illustrates a side elevation view of a stationary version of the tarp storage roller stand mounted on a pup-trailer.

FIG. 4 illustrates a modified version of the tarp storage roller 2 without the basic features of being adjustable to various elevations, or being luffable forward or rearwardly. The vertical legs are offset to move the tarp storage roller 2 forward to provide access for placing the load up to the support stand legs without encountering the danger of damaging the tarp storage roller 2.

Figure 5:
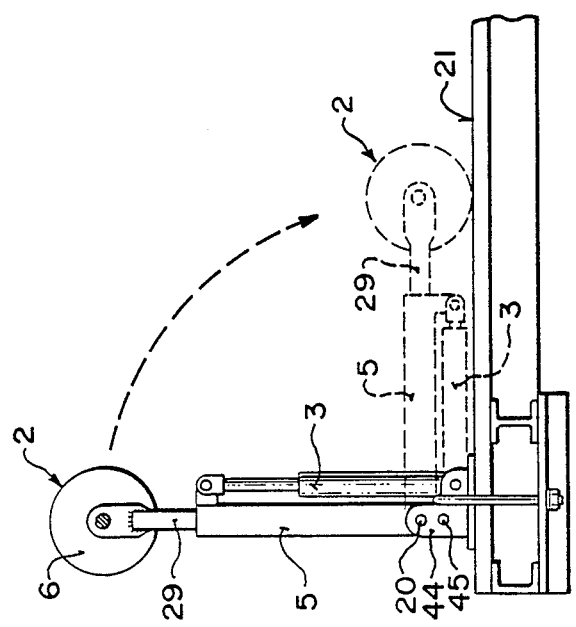

FIG. 5 illustrates a method of luffing the tarp storage roller 2 support stand. The luffing is accomplished by use of a hydraulically actuated cylinder 3. When the roller 2 is horizontal resting on the trailer deck 21, it is raised by directing oil flow under pressure from a hydraulic pump (typically located under the truck or trailer bed) to the base end of the cylinder 3. This forces the cylinder 3 to extend and raises the stand 5 into a vertical position. If desired, the stand 5 can be raised into a 15 degree forward tilt position, as shown in FIG. 3. The support stand 5 will rotate around the pivot pin 20. Directing the flow of hydraulic oil into the rod end of the cylinder 3 retracts the cylinder 3 and luffs the roller stand 2 down the trailer deck 21.

Figure 6:
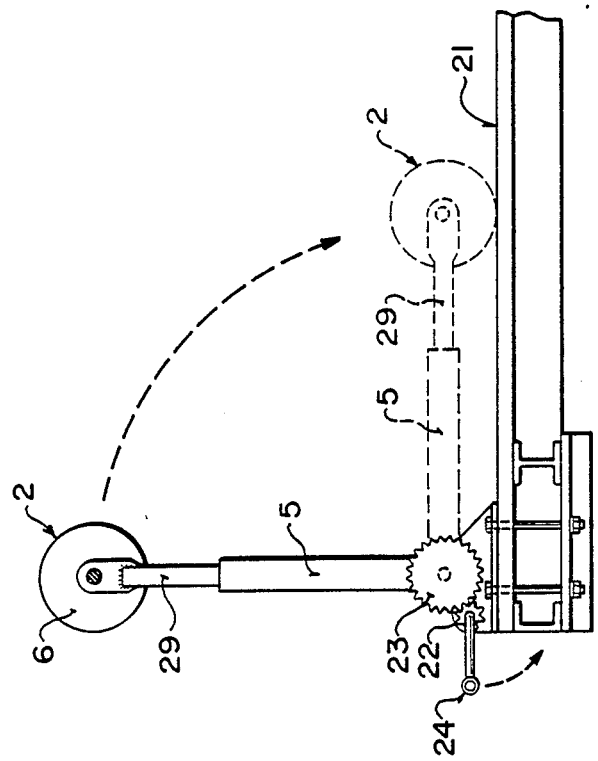
FIGS. 5 and 6 illustrate alternative tarp storage roll stands which can be tilted (luffed) into various positions.

FIG. 6 shows an alternative method of luffing the roller support stand 5 by use of gear and pinion set 22, 23. Pinion 22 is rotated by use of hand crank 24. This motion will rotate the larger gear 23 which is attached to stand 5 and will swing the stand to vertical position or 15 degrees forward, if so desired. By rotating the crank 24 in the opposite direction, the tarp storage roller is brought to rest on the trailer deck 21. When vertical, the stand 5 can be locked with pin 2.

Figure 7:
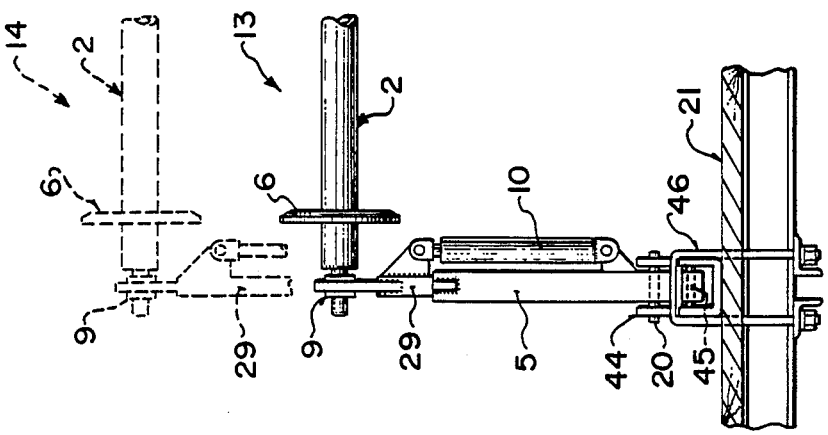

FIG. 7 shows the method of extending the telescopic roller support stand 3,5 to a "high" position 14 by use of hydraulic cylinder 10. When the base end of the cylinder 10 is pressurized, cylinder 10 will extend the inner section 29 of the telescopic stand 5 and raise the tarp storage roller 2 for the purpose of elevating the tarp for use with high loads. Conversely, when the rod end of the cylinder is pressurized the cylinder 10 will retract and will bring the tarp storage roller 2 down to "low" position 13 which is practical for spreading the tarp on low loads.

Figure 8:
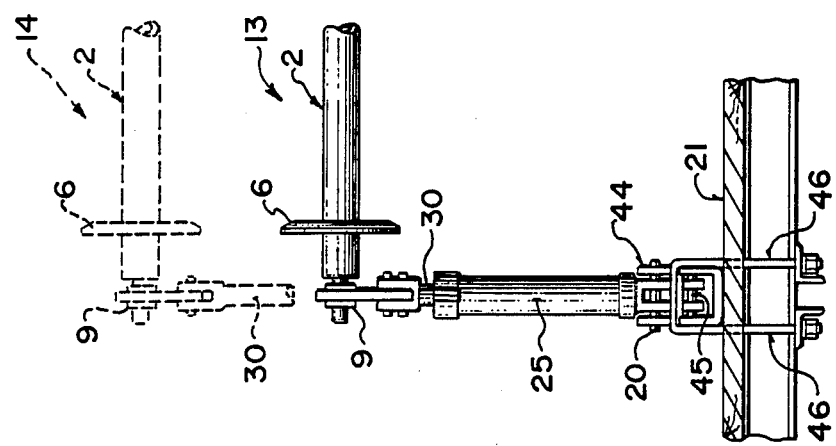

FIG. 8 shows an alternative construction whereby the tarp support stand is constructed of a cylinder 25, in lieu of telescopic mast which is extended by use of a separate cylinder. When the tarp storage roller 2 is to be raised, the base end of cylinder 25 is pressurized. This will extend the piston rod 30 out of the cylinder 25. Cylinder 25 which acts as a support stand and is held in the upright position by use of luffing cylinder 3 such as is shown in FIG. 5. Position 13 showns the tarp storager roller 2 in lowered position while numeral 14 shows it in raised position.

Figure 9:
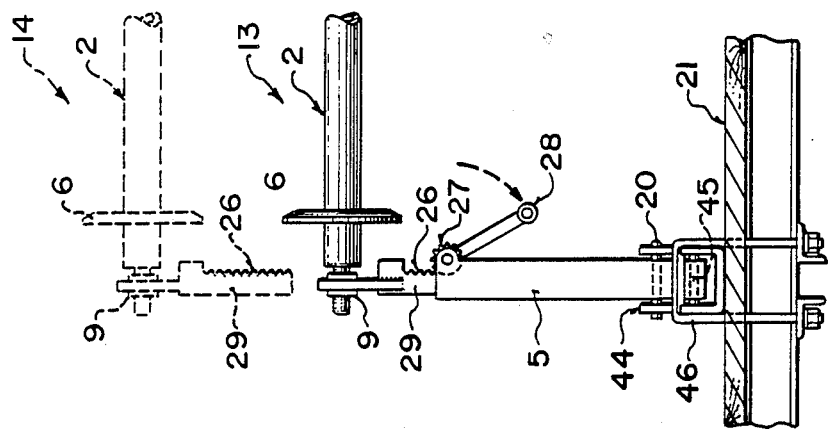
FIGS. 7, 8 and 9 illustrate three alternative designs which enable the tarp storage roller to be adjusted to various elevations to match various load heights.

FIG. 9 shows in end elevation view a method whereby the rack 26 and pinion 27 are used to extend the roller support stand. The teeth of the pinion 27 mesh with the teeth of the rack 26 so that when hand crank 28, which is attached to pinion 27, is rotated, it extends the rack 26 and the inner telescopic section 29 of the stand to which the rack 26 is attached. The stand is retracted by rotation of the hand crank 28 in the opposite direction.

Figure 10:
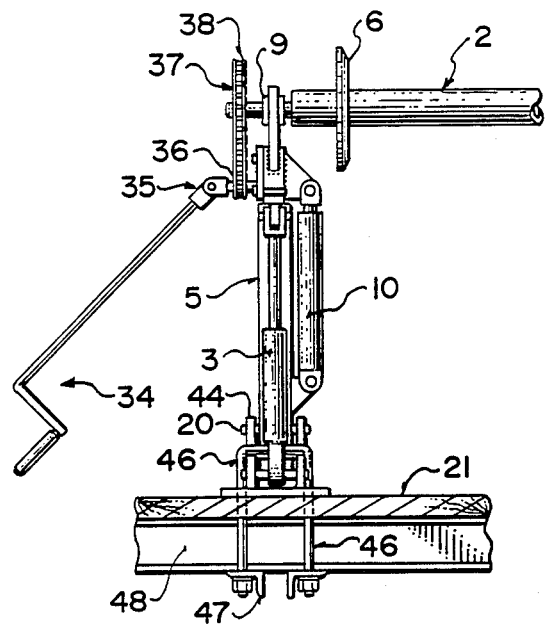
FIGS. 10, 11 and 12 illustrate two alternative methods for rotating the tarp storage roller.

FIG. 10 shows from an end view, the method of rotating the roller 2. Roller 2 is mounted at both ends on self-aligning flange bearings 9. Roller 2 is driven by electric motor 12 through a speed reducing gearbox 8, which is connected to the roller shaft through a coupling 7. Electric power for the motor 12 is drawn from the conventional truck battery.

Gear reduction unit 8 includes a clutch (not shown) which will permit the roller 2 to freewheel when the tarp 1 is being pulled by hand off the roller 2. (If no free wheeling clutch is provided it would be difficult and strenuous to unspool the tarp 1 because of the high friction in the gear reduction unit 12). When the motor 8 is energized to wind the tarp 1 onto the roller 2, the clutch is engaged.

Figure 11:
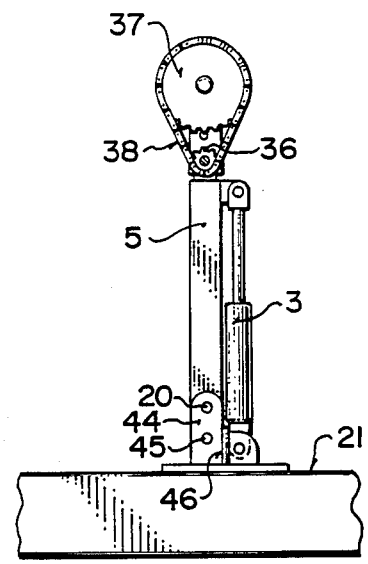
Figure 12:
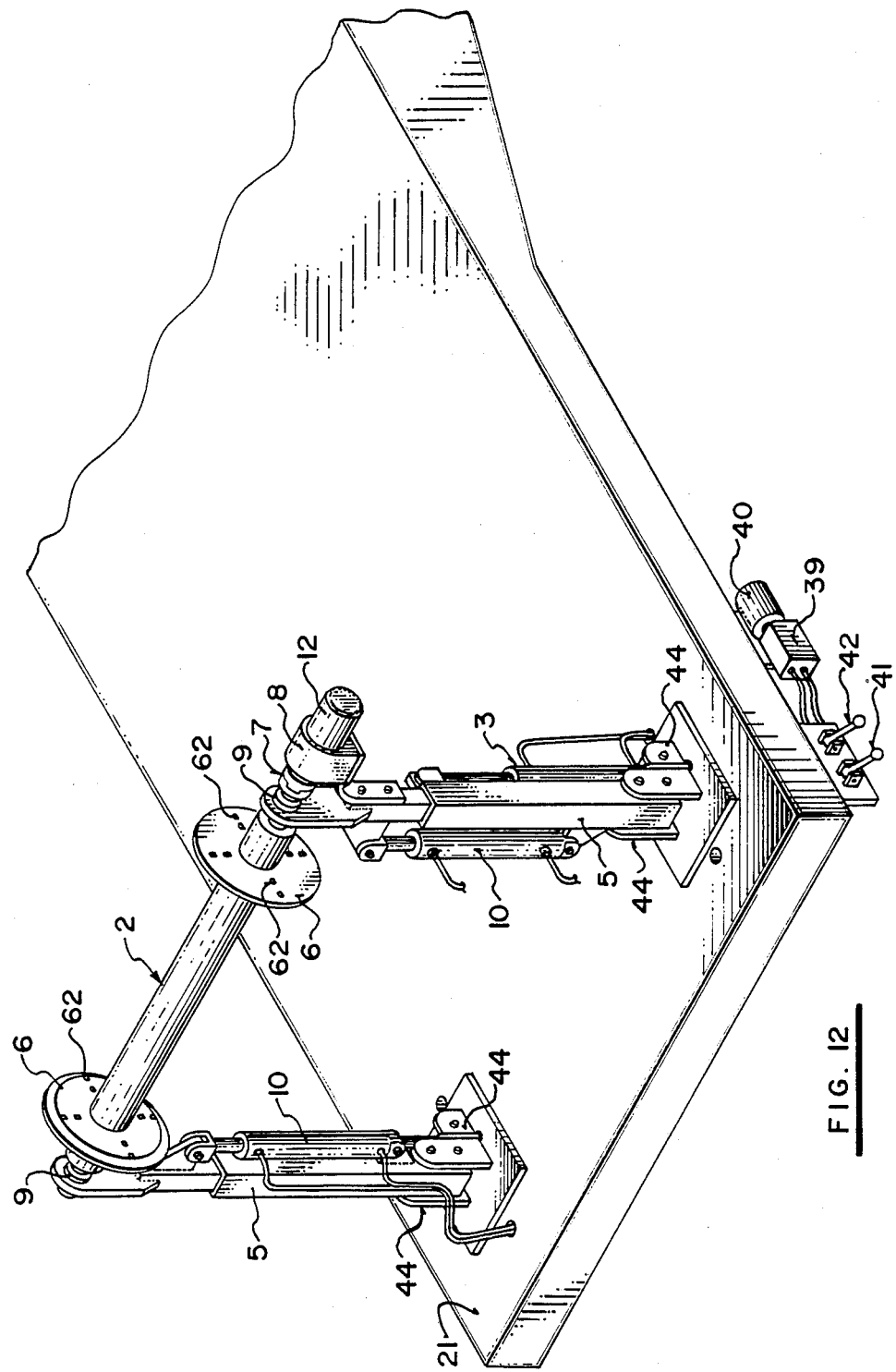

FIGS. 11 and 12 illustrates an alternative hand operated version of the roller drive using hand crank 34. Hand crank 34 is connected to small sprocket 36 by means of a universal joint 35. The drive train is carried through a roller chain 38 to the large sprocket 37. Sprocket 37 is mounted on roller 2 pivot shaft. The chain reduction by mechanical advantage multiplies the effort imposed on the hand crank 34 thus making the work of spooling the tarp 1 onto the roller 2 less strenuous.

FIG. 13 shows an isometric view of the tarp storage roller system. Two flanges 6 will contain the width of the tarp 1 when the tarp is on the roller 2. Because of its large width, eg., up to 24 feet, the tarp 1 must be folded several times longitudinally to reduce the overall width for spooling.

The power supply for the hydraulic luffing cylinders 3 and extension cylinders 10 is provided by a hydraulic pump 39 which is driven by a motor 40. This motor is typically an electric motor which draws its power from the truck battery. Alternatively it can be an air motor driven by compressed air from the compressor which supplies the air to the truck and trailer brake system. Alternatively, a hand pump may be used to supply power to the cylinders 3 and 10. Valves 41 and 42 are used to direct the flow at either end of the luffing or extension cylinders to either extend or retract them as required.

FIG. 14 illustrates in detail the mounting bracket 44 with support stand 5 in vertical position. Pin 45 is used to lock the stand 5 into vertical position. Mounting bracket 44 is fastened to the trailer deck 21 by means of a U-bolt 46 on each of the two support stand legs 3 and 5. A total of 4 holes are drilled through the deck to permit the U-bolts to be secured to the deck 21. Steel beam 47 sets against the trailer cross members 48, and is used to secure the U-bolts and the mounting bracket onto the trailer deck 21. When it is necessary to move the roller 2 fore or aft on the trailer deck 21, four additional holes are drilled into the decking 21, which is normally made of wood and permits easy drilling.

Figure 15:
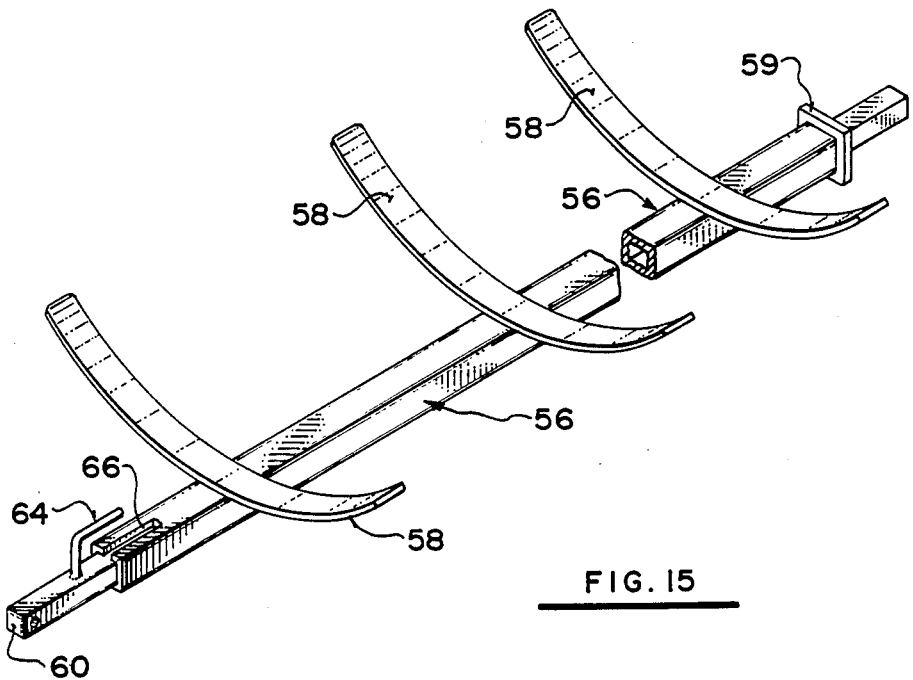

FIG. 15 illustrates the tarp storage roller stand luffed into a resting position in which the roller flanges 6 (not shown) rest on the trailer deck 21. FIG. 15 also illustrates an alternative construction wherein a broad plate 52 replaces bracket 44. Plate 52 has a series of circumferential holes 54 which can be used with a pin for locking pin 45 in alternative positions.

DESCRIPTION OF OPERATION OF THE TARP HANDLER

When travelling without a load, the tarp storage roller will manually be luffed downwardly on the trailer deck 21. When preparing for loading, the operator will energize the pump driving the electric motor, which will activate the hydraulic pump. The pump pumps oil through the hydraulic circulatory actuating valve 41 (FIG. 13). The operator then raises the roller to an upright (vertical) position (see FIG. 13) or will swing it into its most forward position 15 (FIG. 3) so that the operator will be able to load the freight up to the roller support stand 5 without interferring with the roller 2.

After the loading of the truck or trailer is completed, the operator will luff the roller support stand 5 into a vertical position. If the load is high he will extend the support stand 5 upwardly to raise the roller to its "high" position, (see position 14 in FIG. 3). If the load is aft on the deck 21 he will tilt the roller (see position 49 in FIG. 3). He will then disengage the clutch in the gear reduction unit and will pull the tarp 1 by hand off the roller 2 rearwardly over the load. As soon as sufficient tarp has been drawn off the roller 2 to cover the load, the operator can spread the tarp 1 over the sides of the load and secure the tarp to the trailer (see FIG. 1) by bungy cords 50, and the like.

If the operator intends to travel with the roller support stand 5 in vertical position, he can insert a locking pin into the hole 45 (FIG. 14) in the stand base 44 (FIG. 14). This pin will retain the stand in vertical position against wind force and will remove strain on the hydraulic luffing cylinder.

When the load destination is reached and the operator is ready to start unloadng the trailer 21, the operator releases the tarp tie-downs 50 and folds the tarp 1 on the top of the load so that the width of the folded tarp 1 will not exceed the distance between the two flanges 6 on the roller drum 2 (FIG. 13). The operator then energizes the electric motor 12 (FIG. 10) driving the roller 2 whereby the tarp 1 is drawn onto the roller drum 2 until it is completely spooled. At that point the tarp is out of the way and the operator is ready to unload the trailer 21.

After completion of unloading, the operator then prepares for the return trip. If the support stand is extended, the operator will lower the stand to "low" position. Next he will luff the tarp storage roller 2 downward until the flanges 6 are resting on the trailer deck 21. If the stand is left in the upright position, it will create wind resistance and will adversely affect fuel consumption of the tractor. In addition, air pressure when the truck is travelling at high speed creates unnecessary stresses and vibrations on the roller support stand 5 and the luffing mechanism.

The tarp storage roller system can be provided in at least two models, first, the most versatile model which includes all the features such as luffing ability and extendible legs for raising and lowering the drum (as illustrated in FIGS. 1 to 15 with the exception of FIG. 4); and, secondly, a less expensive fixed model as shown in FIG. 4 which does not have luffing and extension cabability.

The former design is intended for trucks/trailers which carry a variety of freight loads with various physical dimensions, eg. high load, low load, forward or aft loads, or high density loads, which are small in volume, and are usually located farther back from the front end of the trailer in order to provide load balance about the trailer wheels.

The latter less versatile design is suitable for dedicated runs, that is runs where the trailer carries the same or a similar load each time with no need to adjust the roller 2. Also, there will be a similar type of a load for the return trip so there is no need to down luff the roller 2 for the return trip.

Finally FIG. 16 illustrates a tarp yoke 56 which can be used to hold the bottom portion of the tarp 1 in place on the roller 2 when the tarp is coiled on the roller 2. The hoops 58 hold the underside of the tarp 1. The ends of the yoke 56 fit through the appropriate holes 62 in opposite flanges 6 of the roller 2. The stop 59 at one end of yoke 56 prevents the yoke 56 from penetrating too far through one of the flanges 6. The opposite side of the yoke 56 has a retractable locking piece 60 which can be padlocked after that end of the yoke 56 has penetrated the hole 62 in the opposite flange 6. The piece 60 can be moved in and out of the end of yoke 56 by means of handle 64 which moves in slot 66. The yoke 56 when positioned on the underside of the roller tarp 2 prevents "ovalizing" of the tarp 1 during a long haul. If no yoke 56 is used, the rolled tarp will gradually slump (ovalize) around the roller 2 due to vibrations and bumps. This causes the tarp 1 to be unevenly wound around the spool and jerk intermittently when the tarp 1 is drawn from the roller 2.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. An apparatus for storing and handling a tarpaulin for a vehicle hauling freight on an open flat deck comprising:
   (a) powered spool means adapted to permit the tarpaulin to be power rolled onto the spool means, or power unrolled from the spool means over the top of the freight carried on the open deck, the tarpaulin being removable from the spool means, when unrolled from the spool means;
   (b) spool supporting means the base of which is pivotally mounted on the open deck about a transversely extending axis, and adapted to be located at any position along the length of the open deck, said spool supporting means being adapted to enable the position of the spool to be adjusted upwardly or downwardly, or forwardly or rearwardly so that it coincides approximately with the forward upper position of the freight on the deck.

2. An apparatus as defined in claim 1 wherein the spool support means is secured to one end of the deck of the freight hauling vehicle.

3. An apparatus as defined in claim 2 wherein the angle of the spool support means with the deck surface can be adjusted.

4. An apparatus as defined in claim 2 wherein the spool support means is secured to the front end of the deck.

5. An apparatus as defined in claim 4 wherein the spool support means is fixed at an angle to the deck.

6. An apparatus as defined in claim 1 wherein the spool means can be lowered to the deck.

7. An apparatus as defined in claim 1 wherein the height of the spool support means can be varied according to the height of the freight being hauled on the vehicle.

8. An apparatus as defined in claim 7 wherein the height of the spool support means is adjusted hydraulically.

9. An apparatus as defined in claim 7 wherein the height of the spool support means is adjusted manually.

10. An apparatus as defined in claim 7 wherein the height of the spool support means is adjusted pneumatically.

11. An apparatus as defined in claim 7 wherein the spool support means is a pair of telescoping arms one positioned at each end of the spool support means, one end of each arm being rotatably connected to the respective end of the spool support means, the opposite end of each arm being pivotally connected to the deck.

12. An apparatus as defined in claim 1 wherein a motor means rotates the spool means.

13. An apparatus as defined in claim 12 wherein the motor means is manually operable.

14. An apparatus as defined in claim 6 wherein the angle of the spool support means relative to the deck surface can be positioned so that the spool rests on the deck surface.

15. An apparatus as defined in claim 1 wherein flanges are mounted at each end of the spool to hold the ends of the rolled tarpaulin on the spool.

16. An apparatus as defined in claim 15 wherein a tarpaulin yoke is affixed between the two flanges and serves to assist in holding the rolled tarpaulin on the spool.

17. An apparatus as defined in claim 16 wherein the yoke is positioned on the underside of the spool.

18. An apparatus as defined in claim 12 wherein the motor means is hydraulically powered.

* * * * *